(12) United States Patent
Kitamura et al.

(10) Patent No.: US 7,295,749 B2
(45) Date of Patent: Nov. 13, 2007

(54) CURABLE RESIN COMPOSITION, OPTICAL COMPONENT AND OPTICAL WAVEGUIDE

(75) Inventors: Kyoji Kitamura, Kyoto (JP); Mitsuo Ito, Kyoto (JP)

(73) Assignee: OMRON Corporation, Kyoto (JP)

( * ) Notice: Subject to any disclaimer, the term of this patent is extended or adjusted under 35 U.S.C. 154(b) by 84 days.

(21) Appl. No.: 10/557,123

(22) PCT Filed: May 24, 2004

(86) PCT No.: PCT/JP2004/007405

§ 371 (c)(1),
(2), (4) Date: Nov. 17, 2005

(87) PCT Pub. No.: WO2004/104059

PCT Pub. Date: Dec. 2, 2004

(65) Prior Publication Data

US 2007/0025679 A1    Feb. 1, 2007

(30) Foreign Application Priority Data

May 26, 2003    (JP)    ............................. 2003-147809

(51) Int. Cl.
 G02B 6/00    (2006.01)
 G02B 6/12    (2006.01)
(52) U.S. Cl. ..................................................... 385/141
(58) Field of Classification Search ................ 385/141, 385/142
 See application file for complete search history.

(56) References Cited

U.S. PATENT DOCUMENTS 6,174,604 B1*  1/2001  Akita et al. .................. 428/392

6,759,104 B2*  7/2004  Hayakawa et al. .......... 428/1.6

FOREIGN PATENT DOCUMENTS

| EP | 0900808 A1 | 3/1999 |
|---|---|---|
| EP | 1046619 A2 | 10/2000 |
| JP | 61-287913 A | 12/1986 |
| JP | 63-243109 A | 10/1988 |
| JP | 4-102240 A | 4/1992 |

(Continued)

OTHER PUBLICATIONS

Supplementary European Search Report; Application No. EP04734608; dated May 8, 2006 (1 page).

(Continued)

*Primary Examiner*—Sung Pak
*Assistant Examiner*—Daniel Petkovsek
(74) *Attorney, Agent, or Firm*—Osha Liang LLP

(57) ABSTRACT

The present invention is to provide a curable resin composition that is desirably used for manufacturing an optical part, in particular, an optical waveguide, that is superior in heat-resistant properties such as a heat-resistant decomposing property and a coloring-resistant property, and has its refractive index precisely controlled.

The present invention provides a curable resin composition, comprising:
 (A) a monomer that contains a polycyclic alicyclic hydrocarbon skeleton and two or more terminal radical polymerizable groups,
 (B) a monomer that contains a perfluoroalkylene skeleton and two or more terminal radical polymerizable groups, and
 (C) a photopolymerization initiator and/or a thermal polymerization initiator.

The present also provides an optical part, in particular, an optical waveguide, formed by photo-and/or thermo-curing the above curable resin composition.

18 Claims, 1 Drawing Sheet

FOREIGN PATENT DOCUMENTS

| | | |
|---|---|---|
| JP | 6-174956 | 6/1994 |
| JP | 7-036068 | 2/1995 |
| JP | 2001-74912 A | 3/2001 |
| JP | 2003-172832 A | 6/2003 |
| JP | 2003-286316 A | 10/2003 |

OTHER PUBLICATIONS

ISA/JP, International Search Report, PCT/JP2004/007405, Aug. 3, 2004 (2 pages).
Patent Abstracts of Japan 06-174956 dated Jun. 24, 1994 (1 page) (cited in specification).
Patent Abstracts of Japan 07-036068 dated Feb. 7, 1995 (1 page) (cited in specification).
Patent Abstracts of Japan 2003-286316 dated Oct. 10, 2003 (1 page).
Patent Abstracts of Japan 2003-172832 dated Jun. 20, 2003 (1 page).
Patent Abstracts of Japan 2001-074912 dated Mar. 23, 2001 (1 page).
Patent Abstracts of Japan 04-102240 dated Apr. 3, 1992 (1 page).
Patent Abstracts of Japan 61-287913 dated Dec. 18, 1986 (1 page).
Patent Abstracts of Japan 63-243109 dated Oct. 11, 1988 (1 page).

\* cited by examiner

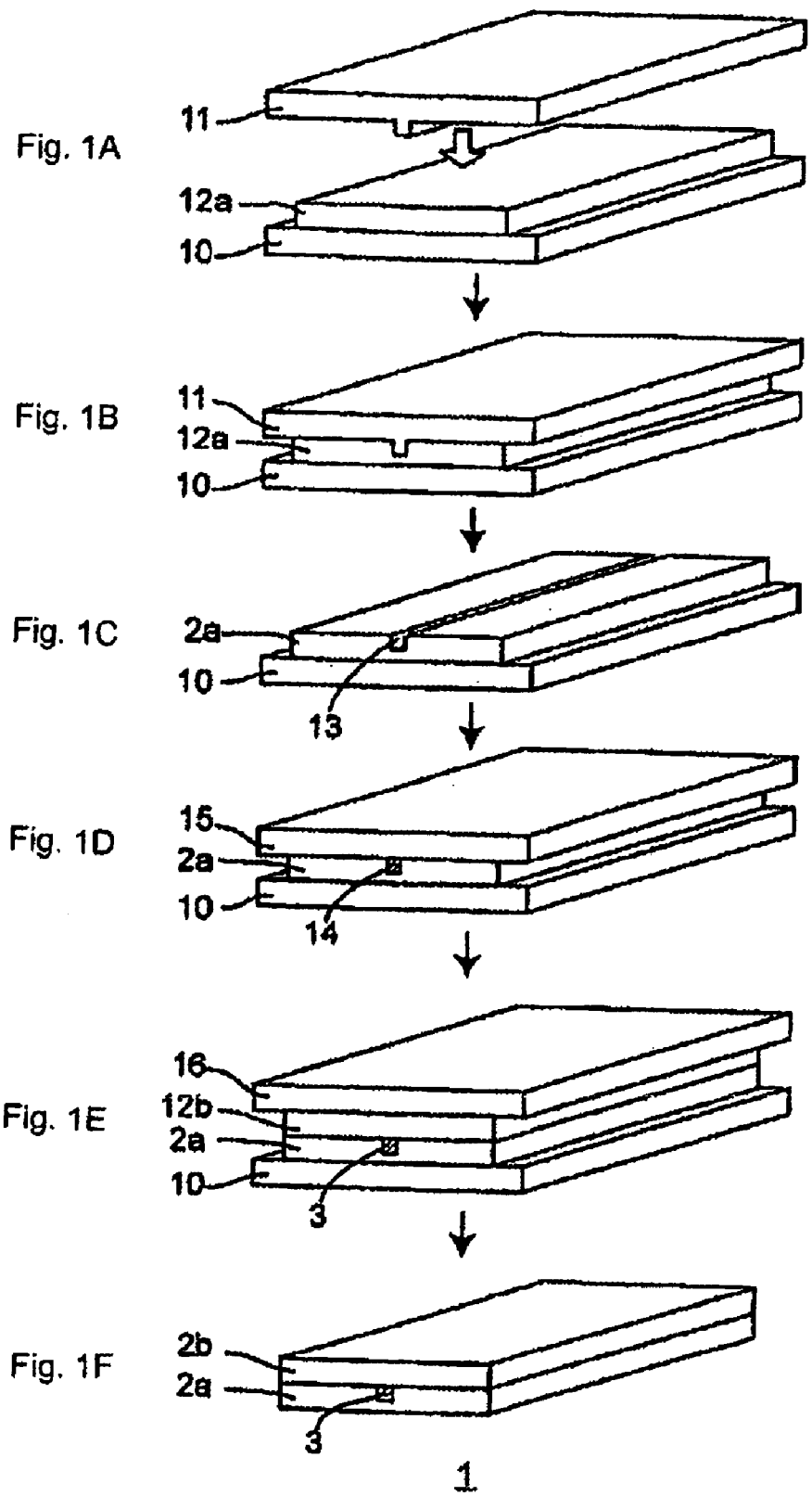

CURABLE RESIN COMPOSITION, OPTICAL COMPONENT AND OPTICAL WAVEGUIDE

TECHNICAL FIELD

The present invention relates to a curable resin composition, an optical part and an optical waveguide. More specifically, the present invention relates to a curable resin composition that forms a cured product that is superior in heat resistance and has a precisely controlled refractive index through a photo-curing process and/or thermo-curing process, and also concerns an optical part and an optical waveguide formed by such a cured product.

BACKGROUND ART

Optical parts, formed by using polymer materials, include optical lenses, such as micro-lenses, micro-lens -arrays, Fresnel-lenses, lenticular-lenses, prism-sheets, diffraction gratings, non-spherical lenses, camera-lenses, glass lenses, and optical communication parts, such as optical fibers, optical waveguides and optical switches. In any of these optical parts, it is important to control the refractive index, and among these, with respect to the optical waveguides, the refractive index should be precisely controlled to a level of the third digit or more below the decimal point. Since the precise control of the refractive index is influenced not only by the polymer materials, but also by forming methods of the optical waveguide, various polymer materials for use in optical waveguides as well as many forming methods for optical waveguides have been proposed. The forming methods are mainly classified as follows.

Selective polymerization method: A polymer-film (substrate) is impregnated with a monomer (the resulting polymer after a photo-polymerization has a refractive index smaller than that of the substrate) containing a photo-polymerization initiator, and only the clad portion of the resulting film is then irradiated with light through a photo-mask to undergo a polymerizing reaction. Thereafter, the monomer on the un-irradiated portion (core portion) is removed by using a solvent or the like so that an optical waveguide is formed.

Photolithography +RIE method: After an optical waveguide layer has been formed through photolithography, a core portion is formed therein through dry-etching, and an upper clad portion is applied thereto and formed thereon.

Direct exposing method: After a core portion has been formed through photolithography, an upper clad portion is applied thereto and formed thereon.

Bleach method: Only the clad portion, which corresponds to a desired portion of a polymer film, is irradiated with energy such as light through a photo-mask to undergo a chemical reaction so that the refractive index is changed; thus, a waveguide is formed.

Stamper method: Onto a monomer (lower clad portion) applied to a substrate, a recessed section is formed in a cured state by using a stamper, and a monomer is then injected into the recessed section to be cured to form a core portion, and an upper clad portion is formed thereon lastly.

Among these forming methods, it is considered that the stamper method is most prospective from the viewpoints of productivity and low costs, and a radically polymerizable acrylate-monomer or a photo-cationic polymerizable epoxy resin is suitable for this forming method.

For example, the use of a fluorinated epoxy resin or a fluorinated epoxy(meth)acrylate-monomer has been proposed (Japanese Patent Application Laid-Open No. 6-174956); however, since the hydroxide group is contained in the cured polymer, the resulting problem is that a great optical loss is caused in the wavelength band for use in light communication, in particular, in a band of 1550 nm. A straight-chain fluorine-containing (meth)acrylate-monomer, which contains no epoxy(meth)acrylate group, is also commercially available; however, this monomer is poor in heat resistance, and in particular, during an assembling process using solder under a high temperature, the polymer tends to be deformed and colored, and causes a problem of poor heat resistance, such as a thermal decomposition.

An active energy-ray curing-type composition for use in optical lenses, which is composed of a fluorine-containing compound, such as a fluorine-containing (meth)acrylate-monomer, and its homopolymer or its copolymer with another (meth)acrylate-monomer, and a non-fluorine polyfunctional (meth)acrylate-monomer, has been proposed (Japanese Patent Application Laid-Open No. 2001-74912). With respect to the non-fluorine polyfunctional (meth)acrylate-monomer, for example, aliphatic or aromatic polyvalent (meth)acrylates and dicyclopentenyl(meth)acrylate have been proposed. Although these proposals have achieved a low refractive index of a cured product (optical lens), a problem arises in which a heat-resistant property is lowered to cause a poor heat resistant decomposing property and a coloring-resistant property under a high temperature.

In order to solve the above-mentioned problems of the optical loss and insufficient heat resistance, a method, which uses fluorinated polyimide as a main skeleton to ensure a sufficient heat resistance, has been proposed (Japanese Patent Application Laid-Open No. 7-36068); however, an optical waveguide, made from a polymer which has a main skeleton composed of fluorinated polyimide, has the following problems:

(1) Insufficient moisture-resistant property,
(2) High birefringence due to an aromatic ring, and
(3) Difficulty in controlling refractive index.

As described above, in the conventional techniques, it has been very difficult to achieve both of a heat-resistant property of a polymer material, such as a heat resistant decomposing property and a coloring-resistant property under a high temperature, and a refractive-index control to a level of the third digit or more below the decimal point.

DISCLOSURE OF THE INVENTION (Problems to be Solved by the Invention)

The present invention has been made to solve the above-mentioned conventional problems.

The objective of the present invention is to provide a curable resin composition that is desirably used for manufacturing an optical part that is superior in heat-resistant properties such as a heat-resistant decomposing property and a coloring-resistant property, and has its refractive index precisely controlled, and, in particular, for forming an optical waveguide by using a stamper method.

In the present specification, the expression "has its refractive index precisely controlled" indicates that, with respect to a plurality of cured products that have been repeatedly cured and formed from the same curable resin composition, deviations in the refractive index thereof are controlled to a level of the fourth digit below the decimal point, more specifically, within a range of ±0.0005.

(Means to Solve the Problems)

In order to achieve the above-mentioned objectives, the inventors, etc. of the present invention have conducted extensive researches on the combination of polymerizable monomers, and found that only when specific two kinds of polymerizable monomers are combined, the above-mentioned objectives can be achieved; thus, the present invention has been devised.

In other words, the present invention provides a curable resin composition that contains the following components (A), (B) and (C) as essential components:

(A) a monomer that contains a polycyclic alicyclic hydrocarbon skeleton and two or more terminal radical polymerizable groups, (B) a monomer that contains a perfluoroalkylene skeleton and two or more terminal radical polymerizable groups, and (C) a photopolymerization initiator and/or a thermal polymerization initiator.

The present invention also provides a cured product and an optical part, that is, in particular, an optical waveguide, which are formed by photo-curing and/or thermo-curing the above-mentioned curable resin composition.

(Effects Superior to Prior Arts)

The cured product formed by the curable resin composition of the present invention not only has a superior heat-resistance and a refractive index that is precisely controlled, but also exerts advantages such as a low optical loss and a superior stamper releasing property. Therefore, the curable resin composition of the present invention serves as a polymer material that is desirably applied to various optical parts such as optical lenses and optical communication parts, and is more particularly applied to a polymer material used for optical waveguides that require a precise controlling process on the refractive index. The cured product of the present invention has such advantages that it can be used for applications other than optical parts, such as heat-resistant coating, abrasion-resistant coating and water-repellant coating materials.

BRIEF DESCRIPTION OF THE DRAWING

FIG. 1 is a flow chart of a sequence of processes that shows one example of a method for forming an optical waveguide by using a curable resin composition of the present invention.

BEST MODE FOR CARRYING OUT THE INVENTION

As described above, the curable resin composition of the present invention contains the following components (A), (B) and (C) as essential components:

(A) a monomer that contains a polycyclic alicyclic hydrocarbon skeleton and two or more terminal radical polymerizable groups (hereinafter, referred to as component (A)), (B) a monomer that contains a perfluoroalkylene skeleton and two or more terminal radical polymerizable groups (hereinafter, referred to as component (B)), and (C) a photopolymerization initiator and/or a thermal polymerization initiator (hereinafter, referred to as component (C)).

The following description will discuss embodiments of the present invention in detail.

"Component (A)"

A monomer, which serves as component (A) of the present invention, contains a polycyclic alicyclic hydrocarbon skeleton and two or more terminal radical polymerizable groups. The alicyclic hydrocarbon skeleton means a cyclic hydrocarbon skeleton that does not exhibit aromatic properties. The alicyclic hydrocarbon skeletons include mono-cyclic and poly-cyclic, that is, di-cyclic or more, skeletons, and in the broader definition, also include terpenes and steroids. In the present invention, in order to allow the cured product to have a superior heat-resistant property, a polycyclic alicyclic hydrocarbon skeleton of dicyclic or more, with a particularly bulky molecular structure, needs to be used. More preferably, a polycyclic alicyclic hydrocarbon skeleton of tricyclic or more is preferably used. The monomer having a mono-cyclic alicyclic hydrocarbon skeleton causes an insufficient heat-resistant property, failing to achieve the objectives of the present invention. In the case of a monomer having an aliphatic hydrocarbon skeleton that is a monomer having a hydrocarbon skeleton other than the alicyclic hydrocarbon skeleton, the resulting cured product has an insufficient heat-resistant property, and in the case of a monomer having an aromatic hydrocarbon skeleton, as generally known, the birefringence of the cured product becomes greater due to the aromatic ring, and the heat-resistant property thereof is also insufficient.

The polycyclic aliphatic hydrocarbon skeleton may have an inner unsaturated bond, such as a double or triple bond, and may also have a substituent of a lower alkyl group the number of carbon atoms of which is comparatively small. With respect to the number of carbon atoms inside each ring forming the polycyclic alicyclic hydrocarbon skeleton, the number of carbon atoms in a range of 3 to 12 has been known; however, the number of carbon atoms of 5 to 8, which is chemically more stable, is preferable, and a polycyclic alicyclic hydrocarbon skeleton constituted by a ring with 5 to 6 carbon atoms is particularly preferable.

Specific examples of the polycyclic alicyclic hydrocarbon skeleton include: bicyclic skeletons, such as bicyclo[2.1.1]hexane, bicyclo[4.1.0]heptane, bicyclo[2.2.1]heptane(norbornene), bicyclo[3.2.1]octane, bicyclo[4.2.0]octane, bicyclo[4.3.0] nonane, bicyclo[4.4.0]decane (decahydronaphthalene), and bicyclo[4.2.2]decane, tricyclic skeletons, such as tricyclo[5.2.1.0$^{2,6}$]decane, tricyclo[3.3.1.1$^{3,7}$]decane (adamantane) and tricyclo[6.2.1.0$^{2,7}$]undecane, and tetracyclic skeletons, such as tetracyclo[6.2.1.1$^{3,6}$0.0$^{2,7}$]dodecane.

The terminal radical polymerizable group, possessed by the monomer corresponding to component (A) of the present invention, means a terminal unsaturated bonding group that is positioned at the terminal of a monomer molecule, and is radically polymerizable by either photo-irradiation or heating in the presence of a photopolymerization initiator or a thermal polymerization initiator (component (C)). With respect to the radical polymerizable group, specific examples thereof include: a (meth)acryloyloxy group, a (meth)acrylamide group, a vinyl group (including an allyl group and a methallyl group, the same is true in the following description), an ethynyl group, an isopropenyl group, a vinyl ether group, a vinyl thioether group, a vinyl ketone group, a vinyl ester group and a vinyl amino group. In the present specification, the notations such as (meth) acryloyloxy group and (meth)acrylamide group respectively represent both of the acryloyloxy group and methacryloyloxy group and both of the acrylamide group and methacrylamide group.

The monomer of component (A) needs to have two or more polymerizing groups, which are selected from the group of the above-mentioned terminal radical polymerizable groups. In the case of the monomer that has a polycyclic alicyclic hydrocarbon skeleton and only one terminal radical polymerizable group, even through an unsaturated bond is included in the skeleton, there is a big difference in polymerizing property between the terminal radical polymerizable group and the unsaturated bond of the skeleton; therefore, normally, only the polymerizing reaction of the terminal radical polymerizable group is available, with the result that the cured product becomes insufficient in the heat-resistant property.

When selected from the viewpoints of curing property (polymerizing property) and physical properties of the cured product, a desirable terminal radical polymerizable group possessed by the monomer of component (A) includes a (meth)acryloyloxy group and a vinyl group, and the monomer of component (A) of the present invention needs to have two or more of these radical polymerizable groups. The two or more terminal radical polymerizable groups possessed by the monomer may be different from each other or may be the same. A more preferably terminal radical polymerizable group is a (meth)acryloyloxy group, and a monomer having a polycyclic alicyclic hydrocarbon skeleton of tricyclic or more having two or more (meth)acryloyloxy groups is most preferably used. Specific examples of preferable monomers include: dimethylol tricyclo[$5.2.1.0^{2,6}$]decane di(meth)acrylate, 1,3-dimethylol tricyclo[$3.3.1.1^{3,7}$]decane di(meth)acrylate, tricyclo[$3.3.1.1^{3,7}$]decane-1,3-diol di(meth)acrylate, 1,3-bis(2-(meth)acryloyloxyethyloxycarbo) tricyclo[$3.3.1.1^{3,7}$]decane and 1,3-bis(2-(meth)acryloyloxyethyloxycarbomethyl) tricyclo[$3.3.1.1^{3,7}$]decane.

With respect to the preparation method of the above-mentioned monomers, conventionally known methods, as they are, are used. For example, dimethylol tricyclo[$5.2.1.0^{2,6}$]decane and (meth)acrylic acid or (meth)acrylic acid chloride are allowed to undergo an esterification reaction in a solvent to give dimethylol tricyclo($5.2.1.0^{2,6}$)decane di(meth)acrylate. For example, 1,3-bis(carboxymethyl)tricyclo[$3.3.1.1^{3,7}$]decane and 2-hydroxyethyl(meth)acrylate are allowed to undergo an esterification reaction to prepare 1,3-bis(2-(meth)acryloyloxy ethyloxycarbomethyl)tricyclo[$3.3.1.1^{3,7}$]decane.

"Component (B)"

A monomer, which serves as component (B) of the present invention, has a perfluoroalkylene skeleton and two or more terminal radical polymerizable groups. The perfluoroalkylene skeleton refers to a skeleton structure in which all C—H bonds in an alkylene group are substituted by C—F bonds, and is generally referred to as a perfluoroalkylene group. The perfluoroalkylene group is generally represented by general formula, —$(CF_2)_n$—. In this formula, n is an integer in a range of 2 to 12, preferably in a range of 2 to 8. The perfluoroalkylene group may have a lower perfluoroalkyl group as its side chain group. The integer n exceeding 13 is not preferable, because this causes serious degradation in the heat-resistant property of the cured product.

In the case of a monomer having an alkylene group, a halogenated alkylene group other than fluorine, or a fluorinated alkylene group in which one portion of the alkylene group is fluorinated, the resulting cured product has an insufficient heat-resistant property, failing to achieve the objective of the present invention.

The terminal radical polymerizable group possessed by the monomer corresponding to component (B) of the present invention is the same as those exemplified as the monomer corresponding to component (A).

The monomer of component (B) needs to have two or more polymerizing groups selected from the group of the above-mentioned terminal radical polymerizable groups. The monomer having only one terminal radical polymerizable group fails to provide a cured product having a superior heat-resistant property. In the same manner as the monomer of component (A), when selected from the viewpoints of curing property and physical properties of the cured product, a desirable terminal radical polymerizable group possessed by the monomer of component (B) includes a (meth)acryloyloxy group and a vinyl group. The two or more terminal radical polymerizable groups possessed by the monomer may be different from each other or may be the same. A more preferable terminal radical polymerizable group is a (meth)acryloyloxy group, and a monomer that has two or more terminal (meth)acryloyloxy groups and is composed of the aforementioned perfluoroalkylene group as its skeleton is particularly preferable. Specific examples of preferable monomers include: a monomer that directly has (meth)acryloyloxy methyl groups or 2-(meth)acryloyloxy ethyl groups at the two terminals of a perfluoroalkylene group that is indicated by general formula, —$(CF_2)_m$— (m=2 to 12) and a monomer that directly has 2-(meth)acryloyloxy ethyloxycarbo groups at the two terminals of a perfluoroalkylene group that is indicated by general formula, —$(CF_2)_n$— (n=2 to 8), and among the former monomer, C2–C8 perfluoroalkylene-ω,ω'-bis ((meth)acryloyloxymethyl) and perfluoroalkylene-ω,ω'-bis (2-(meth)acryloyloxyethyl) are particularly preferable monomers.

With respect to the preparation method of the above-mentioned monomers, conventionally known methods, as they are, are used. For example, perfluorotetramethylene-1,4-bis(hydroxymethyl) and (meth)acrylic acid or (meth)acrylic acid chloride are allowed to undergo an esterification reaction in a solvent to prepare perfluorotetramethylene-1,4-bis((meth)acryloyloxymethyl). For example, perfluorotetramethylene-1,4-dicarboxylic acid and 2-hydroxyethyl (meth)acrylate are allowed to undergo an esterification reaction in a solvent to prepare perfluorotetramethylene-1,4-bis(2-(meth)acryloyloxyethyloxy carbo).

The compounding ratio between component (A) and component (B) of the curable resin composition of the present invention is preferably set in a range of (A):(B)=80:20 to 55:45 (% by weight), preferably (A):(B)=75:25 to 60:40 (% by weight). In order to precisely control the refractive index of the cured product, it is more advantageous to make the compounding rate of component (B) that has a lower refractive index greater; however, when the compounding rate thereof exceeds 45% by weight, the heat-resistant property of the cured product tends to be lowered. In contrast, in the case when the compounding rate of component (B) is less than 20% by weight, although the heat-resistant property of the cured product is sufficient, it becomes difficult to precisely control the refractive index.

"Component (C)"

A photo-polymerization initiator, which serves as component (C) of the present invention, is an essential component used for curing the curable resin composition of the present invention through photoirradiation.

With respect to the photo-polymerization initiator, not particularly limited to a specific compound by the present invention, any of the following generally-used photo-polymerization initiators may be used: carbonyl compound-based photo-polymerization initiators, such as acetophenones, benzophenones, diacetyls, benzyls, benzoins, benzoin ethers, benzyldimethyl ketanols, benzoyl benzoates, hydroxyphenyl ketones and aminophenyl ketones; organic sulfur compound-based photo-polymerization initiators, such as thiuram sulfides and thioxanthones; and organic phosphor compound-based photo-polymerization initiators, such as acyl phosphine oxides and acyl phosphinic acid esters. In the present invention, each of these many kinds of photo-polymerization initiators may be used alone, or two or more kinds of these may be used in combination.

The compounding rate of photo-polymerization initiator (C) is set in a range of 0.5 to 10% by weight, preferably 1 to 7% by weight, with respect to the total amount of component (A) and component (B). When the compounding rate is less than 0.5% by weight, the photo-curing property becomes insufficient, and when the compounding rate exceeds 10%, the curing reaction progresses too quickly and cause bad influences to the physical properties of the cured product, failing to provide a preferable method.

With respect to the thermal polymerization initiator forming another component (C) of the present invention, among thermal polymerization initiators that are decomposed by heat to generate radicals, those thermal polymerization initiators that have a thermal decomposing temperature of about 30° C. or more, preferably about 60° C. or more, are used. With respect to those thermal polymerization initiators, among compounds generally used as thermal polymerization initiators for a radical polymerization reaction conventionally, organic peroxides that produce no by-products such as gases and water are more preferably used. The use of a thermal polymerization initiator having a thermal decomposing temperature of about less than 30° C. makes the curable resin composition of the present invention instable.

Depending on chemical structures, organic peroxides are classified into alkyl- or aryl-hydroperoxides, dialkyl- or diaryl-peroxides, alkyl-peroxide acids and esters thereof, diacyl-peroxides and ketone-peroxides. In the present invention, any one of these organic peroxides may be used.

The compounding rate of the thermal polymerization initiator (C) is preferably set in a range from 0.5 to 5% by weight, preferably from 1 to 3% by weight, with respect to the total amount of component (A) and component (B). The compounding rate of less than 0.5% by weight causes an insufficient thermo-curing property, and the compounding rate exceeding 5% by weight causes the curing reaction to progress too abruptly and give adverse effects to the cured product. In the present invention, one kind of these organic peroxides may be used alone, or two kinds or more of these may be used in combination.

In the present invention, the photo-polymerization initiator and the organic peroxide forming the thermal polymerization initiator are respectively blended independently, or blended in combination. Upon blending in combination, the respective compounding rates are also set as described above.

With respect to the curable resin composition of the present invention, a monomer other than the above-mentioned component (A) and component (B) of the present invention, which has one or more terminal radical polymerizable groups attached to a terminal of the monomer molecule may be blended thereto as a reactive diluent. The reactive diluent is blended when adjustments in the viscosity or curing property of the curable resin composition of the present invention or in the physical properties of the cured product are required. With respect to such monomers, a monomer, which has a (meth)acryloyloxy group or a vinyl group that is the same terminal radical polymerizable group, is preferably used, and a monomer, which has a (meth) acryloyloxy group, is more preferably used, so as to allow component (A) and component (B) to have the same photo-curing property and thermo-curing property. A monomer having two or more (meth)acryloyloxy groups is more preferably used. Specific examples thereof include a polyvalent (meth)acrylate-monomer of divalent or more, such as an aliphatic group monomer and a single-ring alicyclic group monomer.

The compounding rate of the reactive diluent is preferably set to 20% by weight or less with respect to the total amount of component (A) and component (B). The compounding rate exceeding 20% by weight is not preferable since it causes serious degradation in the heat resistant property of the cured product.

To the curable resin composition of the present invention, a small amount of additives, such as a polymerization inhibitor, an antifoam, a photo-stabilizer, a thermal stabilizer, a leveling agent, a coupling agent and an antistatic agent, may be added, if necessary, as long as the addition is limited to a range so as not to interfere with the photo-curing or thermo-curing reaction.

In the case of the photo-curing reaction with photo-polymerization initiator (C) added thereto, irradiation with ultraviolet rays is generally carried out. With respect to the light source of ultraviolet rays, examples thereof include: a super-high pressure mercury lamp, a high pressure mercury lamp, a low pressure mercury lamp, a metal halide lamp, a carbon arc light and a xenon lamp, and a high pressure mercury lamp or a metal halide lamp is preferably used. Although different depending on the component composition of the curable resin composition, the dose of ultraviolet-ray irradiation is normally set in a range from 1000 to 5000 mJ/cm$^2$.

In the case of the thermo-curing reaction with an organic peroxide serving as the thermal polymerization initiator (C) added thereto, the curing process is carried. out by heating the resin composition to a temperature above the thermal-decomposing temperature of the organic peroxide. Therefore, although depending on the kinds of the organic peroxide to be added, the heating temperature is normally set in a range from 10 to 60 minutes.

In the case of a curing process which is a combination of the photo-curing and thermo-curing processes with both of the photo-polymerization initiator and the organic peroxide added thereto, in general, after the photo-curing process has been carried out through irradiation with ultraviolet-rays, the thermo-curing process is carried out by a heating operation to complete the curing process. In comparison with the thermo-curing process, the photo-curing process is superior in handling, curing speed and the like; therefore, in the curable resin composition of the present invention, the photo-curing process, that is, the curing process using ultraviolet-rays, is preferably used.

The cured product to be formed by photo-curing and/or thermo-curing the curable resin composition of the present invention is superior in heat-resistant properties, such as a heat-resistant decomposing property and a coloring-resistant property, and has its refractive index precisely controlled. Therefore, the curable resin composition of the present invention is preferably used for forming the aforementioned optical parts. In the case when an optical waveguide is formed by using the curable resin composition of the present invention through a photo-curing stamper method, the forming property of the stamper method is very good, and the resulting optical waveguide also has the advantage of a reduced optical loss; therefore, the curable resin composition is in particular suitable for the formation of an optical waveguide.

Referring to FIG. 1, the following description will discuss a method for forming an optical waveguide by using the curable resin composition of the present invention. The method shown in FIG. 1 corresponds to the stamper method; however, the optical waveguide of the present invention may be formed by using a conventionally known method, such as the aforementioned photolithography +RIE method and direct exposing method. The curable resin composition of the present invention may be used for forming only either one of a clad portion 2 (lower portion 2a; upper portion 2b) and a core portion 3 of the optical waveguide 1 (see FIG. 1(F)); however, it is preferably used for forming both of the members. The optical waveguide is formed so that the refractive index of the clad portion is made slightly lower than the refractive index of the core portion. In the case when both of the clad portion and the core portion are made from the curable resin composition of the present invention, the adjustments of the refractive indexes of the clad portion and the core portion can be made by slightly changing the compounding ratio of monomer component (A) and monomer component (B).

Upon forming the optical waveguide, as shown in FIG. 1(A), first, a curable resin composition 12a for a lower clad portion is applied to a substrate 10 through a known method such as a spin-coat method and a doctor blade method, and a convex-type stamper 11 is pressed thereon. In this pressed state, a photo-curing process or/and a thermo-curing process is carried out so that a lower clad portion 2a having an engraved section 13 corresponding to a core portion is formed (FIGS. 1(B) and 1(C)). After the convex-type stamper has been released, the engraved section 13 is filled with a curable resin composition 14 for the core portion, and a photo-curing process or/and a thermo-curing process is carried out with a flat plate 15 pressed thereon to form a core portion 3 (FIG. 1(D)). Lastly, a curable resin composition 12b for an upper clad portion is applied thereto, and a photo-curing process or/and a thermo-curing process is carried out with a substrate 16 pressed thereon to form an upper clad portion 2b (FIG. 1(E)); thus, the substrate is removed so that an optical waveguide 1 is completed (FIG. 1(F)). Here, with respect to the substrates 10 and 16, transparent substrates such as glass plates are used when the photo-curing process is carried out.

EXAMPLES

The following description will discuss the present invention in detail by means of examples; however, the present invention is not intended to be limited by the examples.

The heat-resistant property and the precise-controlling property for the refractive index were measured by using the following testing methods.

Heat-Resistance Test

A curable resin composition was injected between two glass plates (thickness: 0.7 mm, size: 10 cm×10 cm) that were held with a gap of 20±1 μm, with spacer tapes inserted in between, and this was then irradiated with ultraviolet rays by using a high-pressure mercury lamp until the dose of ultraviolet-ray irradiation on the glass surface reached 3,000 mJ/cm$^2$.

The glass plates were separated so that a resin film that had been photo-cured was taken out, and measuring-use test pieces (weight=10 mg) were sampled from the center portion thereof. Successively, the test pieces were heated at a temperature-raising rate of 10° C./min from room temperature to 250° C. by using a TG-DTA measuring device (model: 220, made by Seiko Instruments Inc.) so that upon reaching 250° C., the weight loss rate due to heat was measured to obtain the results of measurements on the heat-resistant property. The degree of coloring of the test pieces after the measurements was visually determined.

Tests for Precise-Controlling Property of the Refractive Index

The same sequence of processes under the same conditions as those of the manufacturing processes for the test pieces used for heat-resistant measurements were carried out five times independently so that photo-cured resin films were formed from the same curable resin composition, and by measuring the refractive indexes in the center portions of the respective cured resin films, deviations in the refractive indexes were calculated. The measurements of the refractive indexes were carried out through a prism coupling method by using a prism coupler (model 2010, made by Metricon Corporation) to significant figures of 4 digits under the decimal point at 23° C.

Example 1

Dimethylol tricyclo[5.2.1.0$^{2,6}$]decane diacrylate (Tradename: Light Acrylate DCP-A, made by Kyoeisha Chemical Co., Ltd.)(7.000 g), perfluoro-octamethylene-1,8-bis(acryloyloxymethyl) (Tradename: Fluorolite FA-16, made by Kyoeisha Chemical Co., Ltd.)(3.000 g) and Darocure 1173 serving as a photo-polymerization initiator (made by Ciba Specialty Chemicals Corp.)(0.200 g) were mixed and dissolved to prepare a curable resin composition (I) of the present invention.

By using this curable resin composition (I), a photo-cured resin film was obtained through the above-mentioned method. The transparency of the resulting photo-cured resin film was excellent. The weight loss rate due to heat measured by the heat-resistance test conducted on the photo-cured resin film was less than 1%, ensuring a superior heat-resistant property. No coloring was found on the test pieces after the heat-resistance test. The deviations in refractive indexes were within a range of 1.4923±0.0003 so that a superior precise-controlling property of the refractive index was obtained.

Comparative Example 1

The same components of the same amounts as Example 1 were blended except that in place of dimethylol tricyclo[5.2.1.0$^{2,6}$]decane diacrylate of Example 1, tricyclo[5.2.1.0$^{2,6}$]-3-decenyl acrylate (Tradename: FA-511A, made by Hitachi Chemical Co., Ltd.) (7.000 g) was used so that a curable resin composition (1) was prepared.

The same processes were carried out by using this curable resin composition (1) to obtain a photo-cured resin film. This photo-cured resin film was white and cloudy, and the rate of weight decrease due to the heat-resistance test was 30%, which was extremely high, and the test pieces were colored into yellow.

Comparative Example 2

The same components of the same amounts as Example 1 were blended except that in place of dimethylol tricyclo[5.2.1.0$^{2,6}$]decane diacrylate of Example 1, bisphenol A diglycidyl ether-methacrylic acid 2-mol adduct (Tradename: Epoxyester 3000A, made by Kyoeisha Chemical Co., Ltd.) (7.000 g) was used so that a curable resin composition (2) was prepared.

The same processes were carried out by using this curable resin composition (2) to obtain a photo-cured resin film. This photo-cured resin film was white and cloudy, and the rate of weight decrease due to the heat-resistance test was 10%, which was very high, and the test pieces were colored into yellow.

Comparative Example 3

The same components of the same amounts as Example 1 were blended except that in place of dimethylol tricyclo [5.2.1.0$^{2,6}$]decane diacrylate of Example 1, neopentyl glycol diacrylate (7.000 g) was used so that a curable resin composition (3) was prepared.

The same processes were carried out by using this curable resin composition (3) to obtain a photo-cured resin film. This photo-cured resin film was white and cloudy, and the rate of weight decrease due to the heat-resistance test was 21%, which was very high, and the test pieces were colored into yellow.

Comparative Example 4

The same components of the same amounts as Example 1 were blended except that in place of dimethylol tricyclo [5.2.1.0$^{2,6}$]decane diacrylate of Example 1, 1,4-dimethylolcyclohexane diacrylate (7.000 g) was used so that a curable resin composition (4) was prepared.

The same processes were carried out by using this curable resin composition (4) to obtain a photo-cured resin film. This photo-cured resin film was slightly cloudy, and the rate of weight decrease due to the heat-resistance test was 13%, which was very high, and the test pieces were considerably colored into yellow.

Comparative Example 5

The same components of the same amounts as Example 1 were blended except that in place of perfluoro-octamethylene-1,8-bis(acryloyloxymethyl) of Example 1, perfluorooctylethyl acrylate (Tradename: Light Acrylate FA-108, made by Kyoeisha Chemical Co., Ltd.)(3.000 g) was used so that a curable resin composition (5) was prepared.

The same processes were carried out by using this curable resin composition (5) to obtain a photo-cured resin film. This photo-cured resin film was white and cloudy, and the rate of weight decrease due to the heat-resistance test was 15%, which was very high, and the test pieces were slightly colored into yellow.

Example 2

By using a normally-used method in which 1,3-bis(carboxymethyl)tricyclo[3.3.1.1$^{3,7}$]decane (1,3-adamantane diacetic acid) (made by Tokyo Kasei Kogyo Co., Ltd.) and excessive 2-hydroxyethyl acrylate (Tradename: Light Ester HOA, made by Kyoeisha Chemical Co., Ltd.) were added to a toluene solvent and allowed to undergo an esterification reaction therein, and 2-hydroxyethyl acrylate that had not been reacted with the solvent was then distilled off, solid-state 1,3-bis(2-acryloyloxyethyloxy carbomethyl)tricyclo [3.3.1.1$^{3,7}$]decane was obtained.

The resulting 1,3-bis(2-acryloyloxyethyloxy carbomethyl)tricyclo[3.3.1.1$^{3,7}$]decane (6.000 g), perfluorotetramethylene-1,4-bis(acryloyloxymethyl) (Tradename: F06086D, made by AZmax Co., Ltd.)(3.500 g), 1,4-dimethylol cyclohexane diacrylate (0.500 g) and t-butylperoxy acetate (0.200 g) were mixed and dissolved to prepare a curable resin composition (II) of the present invention.

In the same manner as the preparation process of the test piece of the aforementioned heat-resistance test method, after this curable resin composition (II) had been injected into a gap between two glass plates, the resulting sample was placed in a heating furnace, and heated at 100° C. for 40 minutes, and successively heated at 120° C. for 10 minutes so that a thermo-cured resin film was obtained. This thermo-cured resin film was excellent in transparency. The weight loss rate due to heat after the heat resistance test was 1% or less, which indicated a superior heat resistance. No coloring was found on the test pieces after the heat-resistance test. The deviation in refractive indexes was within a range of 1.5015±0.0003 so that a superior precise-controlled property of the refractive index was obtained.

Comparative Example 6

By using a normally-used method in which 1-carboxymethyl tricyclo[3.3.1.1$^{3,7}$]decane (1-adamantane acetic acid) (made by Tokyo Kasei Kogyo Co., Ltd.) and excessive 2-hydroxyethyl acrylate (the same as described above) were added to a toluene solvent and allowed to undergo an esterification reaction therein, and 2-hydroxyethyl acrylate that had not been reacted with the solvent was then distilled off, solid-state 1-(2-acryloyloxyethyloxy carbomethyl)tricyclo[3.3.1.1$^{3,7}$]decane was obtained.

The same components with same amounts as those of Example 2 were blended except that 6.000 g of the resulting 1-(2-acryloyloxyethyloxy carbomethyl)tricyclo[3.3.1.1$^{3,7}$] decane was used in place of 1,3-bis(2-acryloyloxyethyloxy carbomethyl)tricyclo[3.3.1.1$^{3,7}$]decane used in Example 2 so that a curable resin composition (6) was prepared.

By using this curable resin composition (6), the same processes as those of Example 2 were carried out so that a thermo-cured resin film was obtained. This thermo-cured resin film was white and cloudy, and the rate of weight decrease due to the heat-resistance test was 10%, which was a very high level, with the result that the test pieces were colored into yellow.

Comparative Example 7

The same components with same amounts as those of Example 2 were blended except that 3.500 g of 2-(perfluorobutyl)ethyl acrylate (Tradename: F05906D-D, made by AZmax Co., Ltd.) was used in place of perfluorotetramethylene-1,4-bis(acryloyloxymethyl) so that a curable resin composition (7) was prepared.

By using this curable resin composition (7), the same processes as those of Example 2 were carried out so that a thermo-cured resin film was obtained. This thermo-cured resin film was white and cloudy, and the rate of weight decrease due to the heat-resistance test was 20%, which was a very high level, with the result that the test pieces were slightly colored into yellow.

Example 3

With respect to the optical waveguide, it is necessary to provide a difference in refractive indexes of about 0.50% between a core portion and a clad portion. The curable resin composition (I) relating to Example 1 was used as the core portion, and a curable resin composition (III), formed by mixing and dissolving 7.000 g of dimethylol tricyclo [5.2.1.0$^{2,6}$]decane diacrylate (the same as described earlier), 3.300 g of perfluoro-octamethylene-1,8-bis(acryloyloxymethyl) (the same as described earlier) and 0.206 g of Darocure 1173 (the same as described earlier), was used as the clad portion so that an optical waveguide was formed by using the following method.

After the curable resin composition (III) had been applied to a glass substrate, this was photo-cured (dose of ultraviolet-ray irradiation=3,000 mJ/cm$^2$) with a convex-type stamper (metal mold: convex-type dimension=5 μm×5 μm×10 mm) being pressed thereon, and the convex-type stamper was released so that a lower clad portion having an engraved portion corresponding to the core portion was formed.

The curable resin composition (I) was injected into the engraved portion, and this was photo-cured (dose of ultraviolet-ray irradiation=3,000 mJ/cm$^2$) with a flat plate being pressed thereon so that a core portion was formed. Each of the stampers had a good releasing property.

The curable resin composition (III) was applied thereto, and this was photo-cured (dose of ultraviolet-ray irradiation=3,000 mJ/cm$^2$) with a glass substrate being pressed thereon so that an upper clad portion was formed.

The core portion of the optical waveguide thus formed was cut by the section, and the state of the section was observed after a heat resistance test of 250° C.×5 minutes; however, no change was observed on the appearance. Optical waveguide was confirmed. The measured values of optical loss were 0.4 dB/cm at 1,310 nm and 0.9 dB/cm at 1,550 nm, which were superior values.

Comparative Example 8

A curable resin composition (8), formed by mixing and dissolving 8.000 g of dimethylol tricyclo[5.2.1.0$^{2,6}$]decane diacrylate (the same as described earlier), 2.000 g of octamethylene glycol 1,8-diacrylate and 0.200 g of Darocure 1173 (the same as described earlier), was used as the core portion, and a curable resin composition (9), formed by mixing and dissolving 3.000 g of dimethylol tricyclo[5.2.1.0$^{2,6}$]decane diacrylate (the same as described above), 7000 g of triethylene glycol diacrylate and 0.200 g of Darocure 1173 (the same as described above), was used as the clad portion so that an optical waveguide was formed by using the same processes as those of Example 3.

The core portion of the optical waveguide thus formed was cut by the section, and the state of the section was observed after a heat resistance test of 250° C.×5 minutes, with the result that distortion and boundary separation from the clad portion occurred in the core portion. No optical waveguide was confirmed.

The invention claimed is:

1. A curable resin composition, comprising:
   a monomer that contains a polycyclic alicyclic hydrocarbon skeleton and two or more terminal radical polymerizable groups,
   a monomer that contains a perfluoroalkylene skeleton and two or more terminal radical polymerizable groups, and
   a photopolymerization initiator and/or a thermal polymerization initiator.

2. The curable resin composition according to claim 1, wherein the terminal radical polymerizable groups are (meth)acryloyloxy groups.

3. The curable resin composition according to claim 2, wherein the polycyclic alicyclic hydrocarbon skeleton is a tricyclic or more skeleton.

4. The curable resin composition according to claim 2, wherein the perfluoroalkylene skeleton is a perfluoroalkylene skeleton having carbon atoms of 2 to 8.

5. The curable resin composition according to claim 2, wherein the monomer that contains a perfluoroalkylene skeleton and two or more terminal radical polymerizable groups is perfluoroalkylene-ω,ω'-bis((meth)acryloyloxymethyl) or -bis(2-(meth)acryloyloxyethyl) having carbon atoms of 2 to 8.

6. A cured product, formed by photo-curing and/or thermo-curing the curable resin composition according to claim 2, and showing
   both of a superior heat resistant property and a refractive index that is precisely controlled.

7. The curable resin composition according to claim 1, wherein the polycyclic alicyclic hydrocarbon skeleton is a tricyclic or more skeleton.

8. The curable resin composition according to claim 7, wherein the perfluoroalkylene skeleton is a perfluoroalkylene skeleton having carbon atoms of 2 to 8.

9. The curable resin composition according to claim 7, wherein the monomer that contains a perfluoroalkylene skeleton and two or more terminal radical polymerizable groups is perfluoroalkylene-ω,ω'-bis((meth)acryloyloxymethyl) or -bis(2-(meth)acryloyloxyethyl) having carbon atoms of 2 to 8.

10. A cured product, formed by photo-curing and/or thermo-curing the curable resin composition according to claim 7, and showing
    both of a superior heat resistant property and a refractive index that is precisely controlled.

11. The curable resin composition according to claim 1, wherein the perfluoroalkylene skeleton is a perfluoroalkylene skeleton having carbon atoms of 2 to 8.

12. The curable resin composition according to claim 11, wherein the monomer that contains a perfluoroalkylene skeleton and two or more terminal radical polymerizable groups is perfluoroalkylene-ω,ω'-bis((meth)acryloyloxymethyl) or -bis(2-(meth)acryloyloxyethyl) having carbon atoms of 2 to 8.

13. A cured product, formed by photo-curing and/or thermo-curing the curable resin composition according to claim 11, and showing
    both of a superior heat resistant property and a refractive index that is precisely controlled.

14. The curable resin composition according to claim 1, wherein the monomer that contains a perfluoroalkylene skeleton and two or more terminal radical polymerizable groups is perfluoroalkylene-ω,ω'-bis((meth)acryloyloxymethyl) or -bis(2-(meth)acryloyloxyethyl) having carbon atoms of 2 to 8.

15. A cured product, formed by photo-curing and/or thermo-curing the curable resin composition according to claim 14, and showing
    both of a superior heat resistant property and a refractive index that is precisely controlled.

16. A cured product, formed by photo-curing and/or thermo-curing the curable resin composition according to claim 1, and showing
    both of a superior heat resistant property and a refractive index that is precisely controlled.

17. An optical part made of the cured product according to claim 16.

18. An optical waveguide made of the cured product according to claim 17.

* * * * *